March 31, 1931.  J. J. BOLAND  1,798,139
BEARING
Filed May 24, 1929

INVENTOR.
Joseph J. Boland
BY
ATTORNEY

Patented Mar. 31, 1931

1,798,139

UNITED STATES PATENT OFFICE

JOSEPH J. BOLAND, OF KEYPORT, NEW JERSEY, ASSIGNOR, BY MESNE ASSIGNMENTS, TO UPPERCU-BURNELLI CORPORATION, A CORPORATION OF DELAWARE

BEARING

Application filed May 24, 1929. Serial No. 365,761.

The present invention relates in general to bearings and more particularly to means for positively lubricating a bearing from a source of supply under pressure.

It is common practice to circulate a lubricant through the crank-shaft of an internal combustion engine and to conduct it therefrom by means of various passages to the parts to be lubricated.

With the use of ball bearings in the operation of an engine it is considered highly desirable to maintain such a bearing profusely supplied with the lubricant inasmuch as that type of bearing does not retain the oil between the bearing surfaces as well as one having line contact.

A prime object of the invention is to provide a means whereby such a bearing may be kept constantly flooded with oil from an adjacent conduit such as a hollow crank-shaft.

A further object of the invention is to provide suitable means for the above mentioned purpose that is simple of manufacture and adapted for application without reorganization of the parts.

Various other objects and advantages of the invention will be in part obvious from an inspection of the accompanying drawings and a careful consideration of the following particular description and claims of one form of mechanism embodying my invention.

Figure 1:
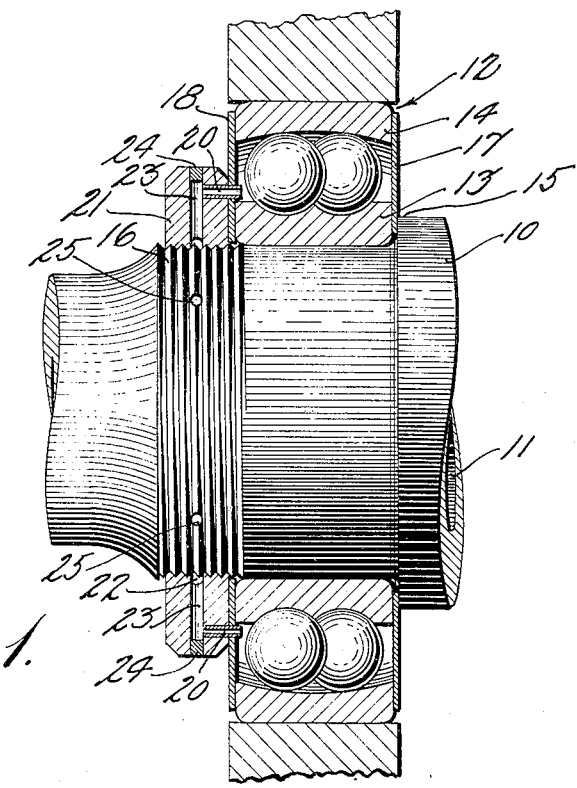
Figure 1 is a longitudinal section of the present invention as applied to the crankshaft of an engine.
Figure 2:
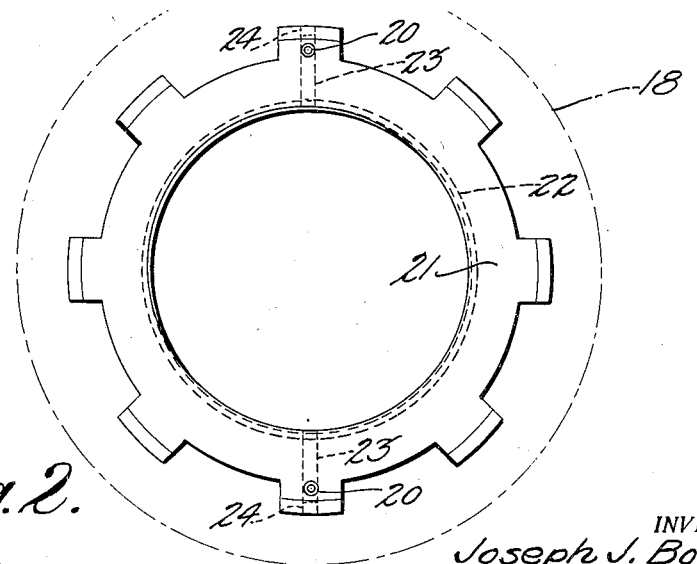
Figure 2 is a detail end view of the bearing retaining nut.

With reference to the drawings, 10 designates a portion of a crank-shaft provided with a longitudinal bore 11 through which a lubricant is circulated in the usual manner. The crank shaft is supported by a ball bearing 12 having an inner race 13 and an outer race 14. Such a bearing ordinarily directly abuts the shoulder 15 on the shaft 10 and is held in place by a retaining nut engaging the screw-threads 16.

In the present instance I have inserted between the bearing and said shoulder a thin disk 17 of a diameter great enough to cover the space between the inner and the outer races. On the opposite side of the bearing I have provided a similar disk 18 into which there are securely fastened a plurality of short tubes 20 which extend into the bearing 12.

The retaining nut 21 which in this instance holds the parts together by engagement with the screw-threads 16, is provided with an annular groove 22 and a transaxially disposed bore 23 of small diameter which is open on the inner side of the nut and connects with the groove 22. The outer ends of the bore are closed by means of the plugs 24. A number of co-axially disposed passages are formed in the nut which connect with said bore 23 and it is into these openings that the tubes 20 are inserted in a manner as to make a self-contained unit of the nut and disk 18.

The crank-shaft is provided with one or more openings 25 which permit the lubricant to flow from its interior to the groove 22 and thence to the bearing 12 via the bore 23 and the tubes 20.

It will be readily understood that the bearing can, with the use of the means herein proposed, be kept constantly full of lubricant even if the oil pressure should become low as the effect of centrifugal force on any lubricant within the crank-shaft will tend to force it into the bearing.

I am fully aware that a special bearing can be made of the type shown, in which the two disks 17 and 18 are a fixed or integral part of the inner race 13 and the use of such a bearing in combination with the means 21 is considered as being within the scope of the invention.

Any suitable means may be employed for locking the retaining nut 21 on the crankshaft.

Variations may be resorted to within the scope of the invention and portions of the improvements may be used without the others, whilst not departing from the spirit of the invention.

Having thus described my invention, I claim:

1. In apparatus of the class described, the combination with a hollow shaft adapted to supply oil to a bearing having races, of a disk on either side of said bearing adapted to form a closure for the space between the races, and an annular member surrounding said shaft and adapted to convey oil from said shaft to said bearing.

2. In the art of lubricating a bearing, the combination with a hollow shaft provided with openings for the extrusion of a lubricant therefrom and a bearing to be lubricated, of a means for conveying the lubricant to and retaining it within the bearing comprising a pair of disks one on either side of the bearing to provide a closure for the space between the bearing races, and a means for securing said bearing and disks in operative relation with the shaft; the last said means being provided with passages adapted to connect with the openings of said shaft so as to convey the lubricant from said shaft through one of said disks to the bearing.

3. In apparatus of the class described, the combination with a shaft adapted to supply oil to a shaft bearing, of a bearing retaining member disposed adjacent to the bearing and provided with passages adapted to convey oil from said shaft to said bearing, and a closure for each side of the bearing adapted to prevent the escape of the oil from the bearing.

4. In apparatus of the class described, the combination with a shaft adapted to supply oil to a shaft bearing, of a bearing retaining member surrounding said shaft adjacent said bearing and provided with an inner annular groove and passages connecting therewith and adapted to convey oil from the shaft to said bearing, and a closure for each side of the bearing adapted to prevent the escape of the oil from the bearing.

5. In apparatus of the class described, the combination with a shaft having openings adapted to supply oil to a bearing having spaced apart races, of a means on either side of said bearing adapted to form a closure for the space between the races, and an annular member engaging the shaft and providing a retaining means for the bearing, said annular member provided with an inner circumferential groove connecting with the openings of the shaft said member being further provided with passages connecting with said groove and adapted to convey oil from said shaft to said bearing.

6. In a device of the class described, the combination with a hollow shaft having openings adapted to supply oil to a bearing, of a bearing having spaced apart races, a closure on either side of the bearing for the space between the races, an annular nut adapted to engage the shaft so as to retain said bearing thereon said nut having an inner annular groove connecting with the shaft openings and radially disposed connecting passages, a plurality of tubes extending from said passages through one of said closures; the whole adapted to convey oil from the shaft to the bearing.

Signed at Keyport, in the county of Monmouth, and State of New Jersey this 22nd day of May, 1929.

JOSEPH J. BOLAND.